United States Patent [19]

Finkler

[11] Patent Number: 4,524,525
[45] Date of Patent: Jun. 25, 1985

[54] DIAMOND GAUGE WITH THREE-DIMENSIONAL STONE SIMULANT

[75] Inventor: Saul M. Finkler, East Meadow, N.Y.

[73] Assignee: Centennial Jewelers, Inc., New York, N.Y.

[21] Appl. No.: 580,080

[22] Filed: Feb. 14, 1984

[51] Int. Cl.³ .............................. G01B 3/46; G01B 5/12
[52] U.S. Cl. ...................................... 33/178 B; 30/358; 81/7
[58] Field of Search ............................ 33/168 R, 178 B; 30/358; 81/7

[56] References Cited

U.S. PATENT DOCUMENTS

| | | | |
|---|---|---|---|
| 393,232 | 11/1888 | Heppding | 81/7 X |
| 679,143 | 7/1901 | Ford | 81/7 |
| 2,377,679 | 6/1945 | Eckstein | 33/178 B |
| 2,767,478 | 10/1956 | Adams | 33/178 B |
| 3,318,006 | 5/1967 | Martinez | 33/168 R |
| 4,043,045 | 8/1977 | Rodriguez | 33/168 R X |
| 4,107,850 | 8/1978 | Adler | 33/178 B |

FOREIGN PATENT DOCUMENTS

| | | | |
|---|---|---|---|
| 586124 | 12/1924 | France | 81/7 |
| 951174 | 4/1949 | France | 33/178 B |

*Primary Examiner*—Robert S. Ward
*Attorney, Agent, or Firm*—Ostrolenk, Faber, Gerb & Soffen

[57] ABSTRACT

A set of diamond gauges for sizing settings for small diamonds. The gauge includes a stone simulant having a central axis and having sections corresponding generally to the culet, the girdle and the table of a brilliant cut diamond. A handle is connected to the section of the stone simulant corresponding to the table and extends in a direction generally parallel to the central axis. In the preferred embodiment, the handle is generally cylindrical in shape and coaxial with the central axis.

20 Claims, 16 Drawing Figures

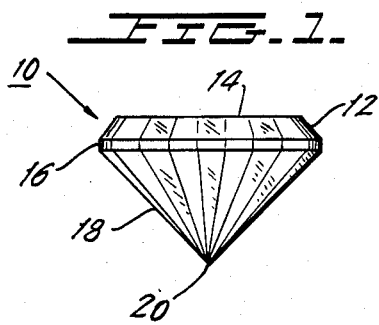
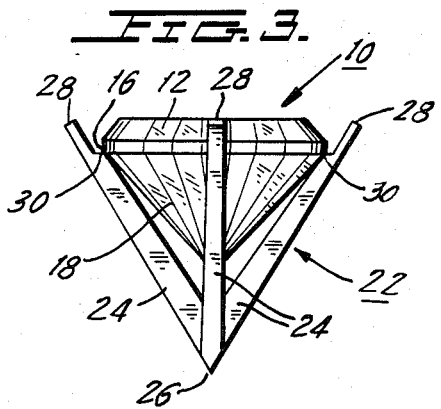
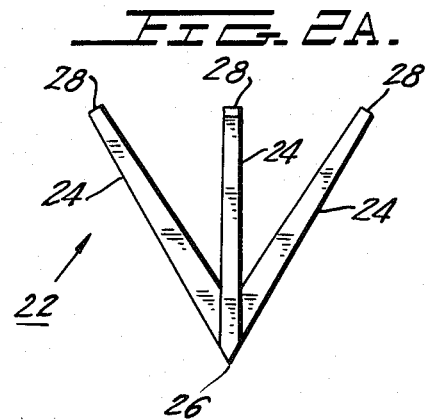
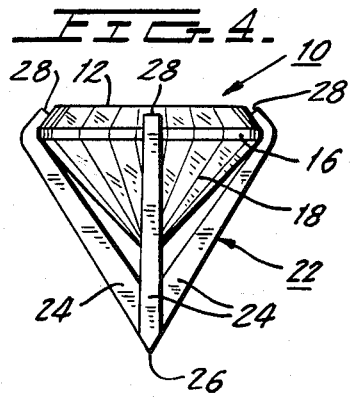
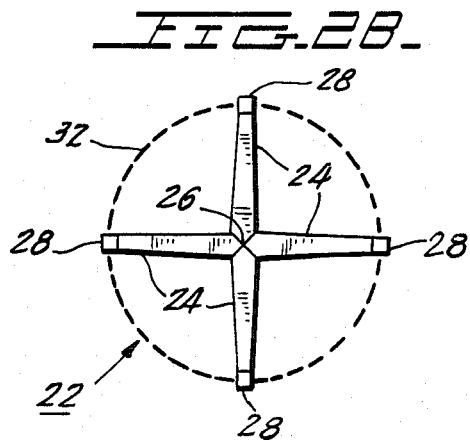
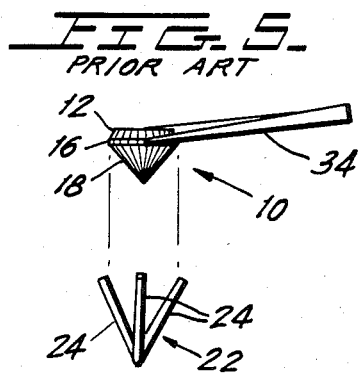

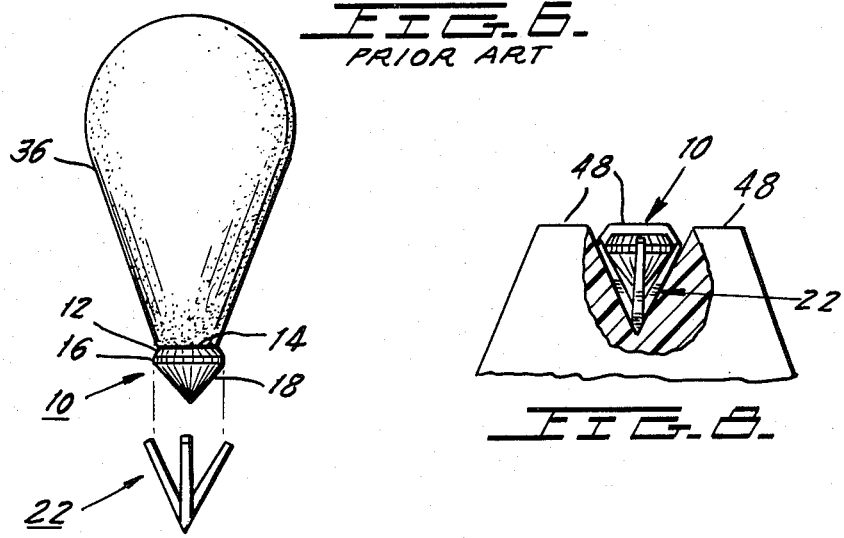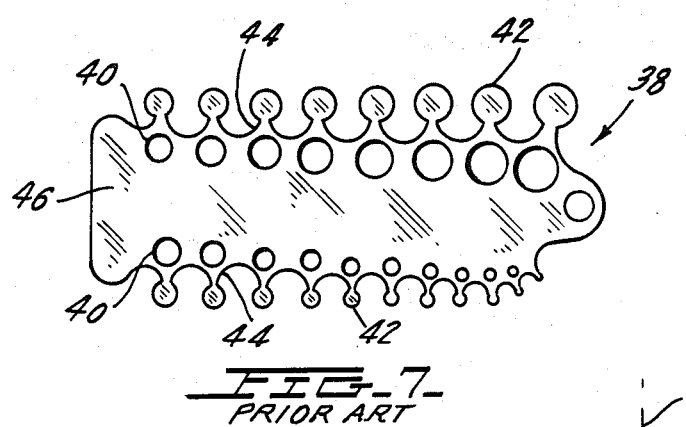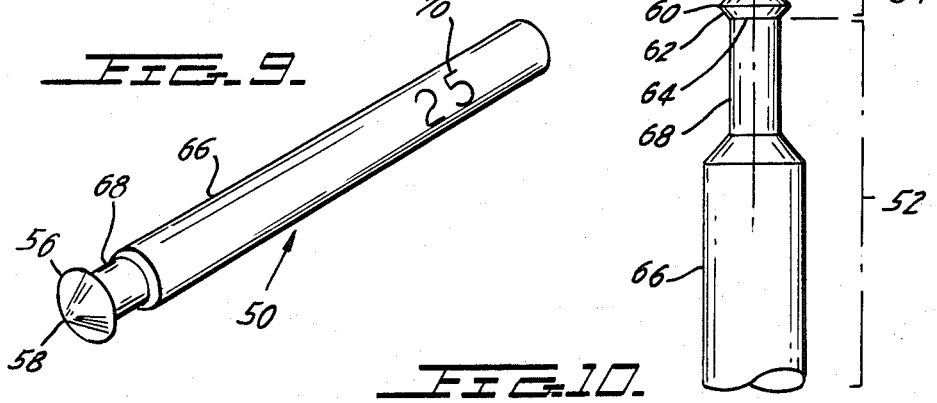

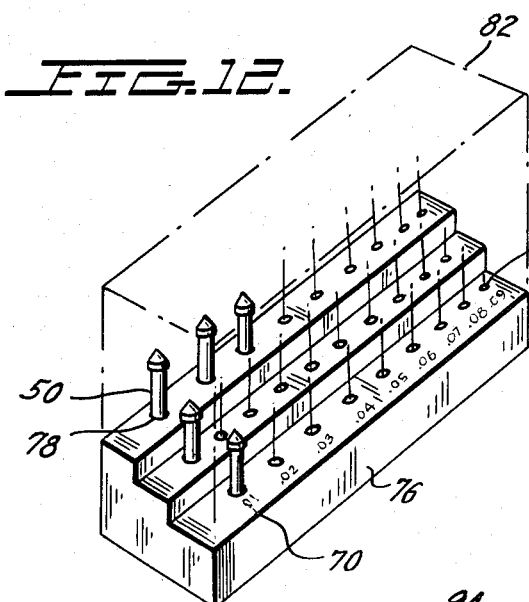
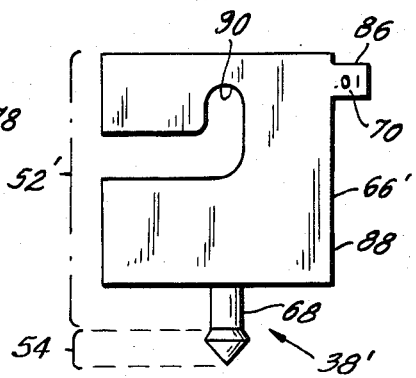
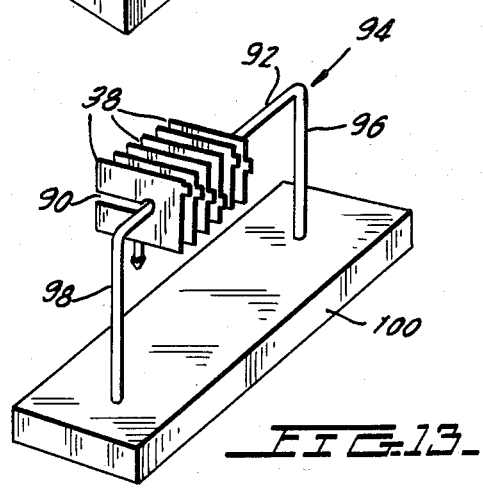
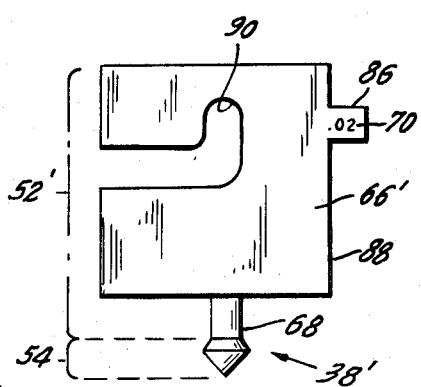
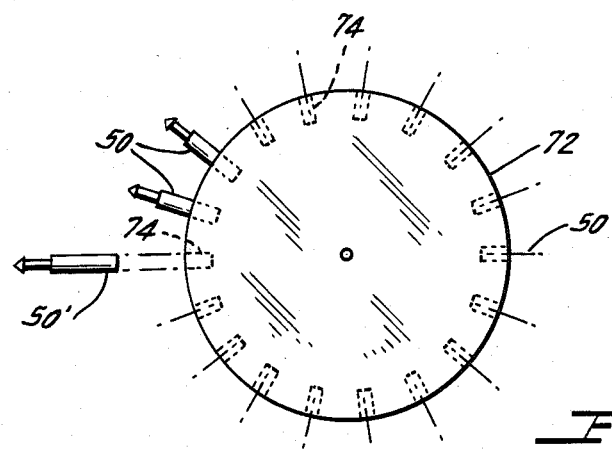

DIAMOND GAUGE WITH THREE-DIMENSIONAL STONE SIMULANT

BACKGROUND OF THE INVENTION

The present invention relates to a diamond gauge which enables the user to determine what size diamond will fit in a given setting without the need to manipulate the diamond itself.

In the preparation of jewelry, it often becomes desirable to incorporate a pluarality of relatively small diamonds in the jewelry design. These diamonds may provide an appropriate framing or setting for one or more larger stones or may themselves form a design independent of any larger stones. Such small diamonds are held in place by settings which typically include a plurality of prongs although other types of settings are known. Before placing the diamonds in their settings, a determination must be made as to the size of the diamond which will fit into a given setting. This process becomes quite difficult when sizing relatively small diamonds ranging from ½ point (1/200th of a carat) up to approximately 50 points (50/100ths of a carat).

To better understand this procedure, the manner in which a round diamond is set in a standard four-prong setting will now be described with reference to FIGS. 1-3. While reference is made to a diamond and a four-prong setting, it will be understood that the present invention is useful in connection with other stones and with settings other than a four-prong setting.

Small diameters are normally cut in a round shape known generally in the art as a brilliant cut. This shape is illustrated in FIG. 1. As shown therein, the diamone 10 has a plurality of star facets 12 extending at an angle between a flat table 14 and a girdle 16. The girdle represents the radially outmost portion of the diamond and is the portion of the diamond which is primarily supported by the setting. A plurality of depending facets 18 extend downwardly from the girdle 16 and terminate at a culet 20 defining the bottom point of the diamond.

The shape of a standard four-prong setting is illustrated in FIGS. 2A and 2B. As shown therein, the setting 22 includes four prongs 24 which extend upwardly and outwardly from a common base 26. Each of the prongs 24 terminates at a respective top end 28.

As best shown in FIG. 3, before the diamond 10 is placed in the setting 22, a small ledge 30 is cut in each of the prongs 24. The ledge 30 is formed by filing a small indentation in each prong 24 slightly below the end 28 of the prong. The diamond 10 is then placed in the setting 22 such that the top of the depending facets 18 located immediately below the girdle 16 sit on the ledges 30. Thereafter, the tips 28 of the prongs 24 are bent around the girdle and onto the bottom of the star facets 12 as shown in FIG. 4 so as to securely hold the diamond 10 in the setting 22.

As should be clear from the foregoing, the outer radius of the diamond defined by the girdle 16 must be slightly less than the outer radius of an imaginary circle 32 (FIG. 2B) encompassing the tips 28 of the prongs 24. Additionally, the depth of the setting 22 extending from the ledge 30 down to the common base 26 must be substantially greater than the depth of the diamond 10 as measured from the girdle 16 to the culet 20 in order to ensure that the diamond 10 contacts the setting 22 substantially only at the girdle 16 so as to ensure maximum brilliance of the stone in it setting.

As should be clear from the foregoing, the relationship between the size of the stone 10 and the setting 22 is a fairly exact one. A setting designed for a 10 point stone will at most receive a stone within one or two points of that size. When setting smaller stones, a larger number of stones are normally fitted into a single ring or other article of jewelry. These stones may all be of the same size or may be of different sizes. If of different sizes, the setter must determine the particular size stone which fits into each setting. Even if the settings are of the same size, the setter often does not know the size of the setting which is standard for a particular style ring. Even if he knows the standard size, the actual size of the settings may vary from ring to ring. For this reason, the stone setter must determine what size stone will actually fit into each setting of a given ring or other article of jewelry.

The standard method of making this determination is for the experienced diamond setter to make an educated estimate of the size of the stone which will fit into the setting and to pick up such a stone and try it in the setting. If the stone is not the right size, the stone is returned to its casing (normally an unfolded sheet of diamond paper) and another stone which has now been estimated to be of appropriate size is picked up and tried. This process is continued until the setter has determined the actual size of the setting.

Two methods are normally used to pick up the stone and size it in the setting. The first of these methods is illustrated in FIG. 5 wherein a pair of tweezers 34 are utilized to grab hold of opposite ends of the girdle 16. The diamond 10 is then placed in the setting 22 and its fit determined.

While this process will enable the setter to determine the actual size of the setting 22, it has several drawbacks. Initially, a great deal of skill is required for the setter to properly manipulate the tweezers 34 to carefully pick up the diamond 10 along the girdle 16 and securely hold the diamond 10 until it is placed into the setting 22. Even when the setter has much skill in this area, it is quite usual for him to drop a diamond which can easily damage the diamond or result in the loss of the diamond due to its small size. In addition, once the diamond has been placed in the setting, a substantial amount of care and skill is required to enable the setter to pick up the diamond using the tweezers since he must grab the girdle at a location remote from the prongs 24 of the setting 22.

In an effort to overcome some of these drawbacks, diamond setters often use a slab of clay 36 (FIG. 6) which has been formed into a cone shape, the tip of which attachs to the table 14 of the diamond 10. For ease of illustration, the slab of clay 36 is shown to be only several times larger than the diamond 10. In actual practice, the diamond 10 will be many times smaller than that illustrated in the Figure and the slab of clay 36 will be many times larger than that illustrated. If the diamond 10 is sufficiently small, the tip of the slab of clay 36 will extend over the star facets 12 and may encompass portions of the girdle 16. Since the clay is adhesive in nature, it will securely hold the diamond 10 and enable the setter to easily pick up the diamond and place it in the setting 22. The primary drawback of this method is that dirt and grease from the clay 36 will be deposited on the stone 10 with the result that the stone will be dirty when it is returned to its unfolded diamond paper packet. This necessitates preliminary cleaning of the diamonds prior to subsequent manipulation or placing them into another setting.

In order to overcome some of the deficiencies of the foregoing processes, the prior art has suggested the use of a diamond gauge which is shown, by way of illustration, in FIG. 7. As shown therein, the diamond gauge 38 includes a plurality of round openings 40 and a plurality of circular projections 42. The openings 40, as well as the projections 42, vary in size corresponding to standard diamond sizes (typically between 3 points and 4 carats). The openings 40 are utilized primarily to measure the size of diamonds 10 (the holes are placed around the diamond to determine its size) while the projections 42 are utilized to measure the size of a setting 22. A primary disadvantage of the diamond gauge 38 is that its planar structure only simulates the girdle 16 of the diamond and, therefore, provides no information as to whether the depth of the setting 22 is sufficient to receive the entire depth of the diamond 10. Thus, while the gauge 38 will provide some indication as to the radial size of the setting 22, it will not indicate whether a stone of the indicated size would actually fit into the particular setting.

Another drawback of the stone gauge 38 lies in the fact that the connecting portion 44 connecting the circular projections 42 to the base 46 of the stone gauge extends radially from the projections 42. The connecting portions 44 must be manipulated to fit in between adjacent prongs 24 which is difficult, and sometimes impossible, especially with extremely small size settings. These projections 42 also are a problem when the setting being sized is surrounded by higher settings or is otherwise recessed in a ring or other item of jewelry. With reference to FIG. 8, a setting 22 may be surrounded by gold projections 48 which form part of a highly stylized piece of jewelry. In such a case, the projections 48 prevent the connecting portion 44, and, for that matter, the base 46, of the diamond gauge 38 from being oriented in a low enough plane to permit any projection 42 to be placed within the setting 22.

While the foregoing drawbacks of the prior art methods of hand manipulating stones have been known for well over 50 years, the only solution to this problem suggested by the art is the stone gauge illustrated in FIG. 7. While several variations on this planar stone gauge have been suggested (see, for example, U.S. Pat. No. De. 162,848), all of the prior art gauges have utilized this planar structure and have, therefore possessed the foregoing disadvantages.

BRIEF DESCRIPTION OF THE PRESENT INVENTION

The primary object of the present invention is to overcome the foregoing drawbacks of the prior art and to provide a novel diamond gauge for sizing settings.

In accordance with the present invention, a series of gauges are provided, each having an individual handle connected to a three-dimensional stone simulant which simulates the size and shape of a brilliant cut diamond of a particular size and having a girdle, a culet and a table. The handle extends along the central axis of the stone simulant which is defined by a line drawn from the culet to the center of the girdle so that the stone simulant may actually be placed into a setting even if the setting is surrounded by projecting portions of the jewelry. Since the stone simulant is three-dimensional, it will provide the setter with information regarding both the radial size of the setting and the sufficiency of the depth of the setting.

The utilization of the foregoing gauge places a simulant of the stone into the setting and thus provides an immediate indication of the particular size of stone which will best fit into the setting, thereby reducing the manipulation of the stones for that particular setting to the one operation of picking it up and placing it in a setting without repetitive operations which can have the deleterious effects described above.

In accordance with the present invention, the diamond gauge comprises:

a three-dimensional stone simulant having a central axis and having sections corresponding generally to the culet, the girdle and the table of a cut diamond; and a handle connected to said section corresponding to the table of a cut diamond and extending in a direction generally parallel to said central axis.

In the presently preferred embodiment, the handle is generally cylindrical in shape and generally coaxial with the central axis. The handle includes a gripping section which is easily held by a human hand and a neck section connecting the gripping section to the stone simulant. In an alternative embodiment, the gripping section is planar in shape.

A set of diamond gauges in accordance with the present invention comprises:

(A) a base having a plurality of openings therein; and (B) a plurality of diamond gauges equal in number to the number of said openings, each said diamond gauge being received in a respective said opening, each said gauge including:

(1) a three-dimensional stone simulant having a central axis and having sections corresponding generally to the culet, the girdle and the table of a cut diamond; and (2) a handle connected to said section corresponding to the table of a cut diamond and extending in a direction generally parallel to said central axis.

BRIEF DESCRIPTION OF THE DRAWINGS

For the purpose of illustrating the invention, there are shown in the drawings several embodiments which are presently preferred, it being understood, however, that the invention is not limited to the precise arrangements and instrumentalities shown.

FIG. 1 illustrates a standard shape of a precious stone, such as a diamond.

FIG. 2A is a front view of a standard four-prong setting for the stone of FIG. 1.

FIG. 2B is a top view of the setting of FIG. 2A.

FIG. 3 illustrates the manner in which the previous stone of FIG. 1 sits in the setting of FIG. 2A after notches have been formed in the setting.

FIG. 4 illustrates the manner in which the stone of FIG. 1 is received within the setting of FIG. 2A after the ends of the prongs of the setting have been bent around the stone.

FIG. 5 illustrates a first prior art method of sizing a setting.

FIG. 6 illustrates a second prior art method of sizing a setting.

FIG. 7 illustrates a prior art stone gauge utilized to size a setting.

FIG. 8 illustrates the manner in which a setting may be located between higher projections in a piece of jewelry (partially broken away).

FIG. 9 is a perspective view of a stone gauge constructed in accordance with the principles of the present invention.

FIG. 10 is a side view of the stone gauge of FIG. 9.

FIG. 11 is a front view of a stone gauge set constructed in accordance with one embodiment of the present invention.

FIG. 12 is a second embodiment of a stone gauge set constructed in accordance with the principles of the present invention.

FIG. 13 is a third embodiment of a stone gauge set constructed in accordance with the principles of the present invention.

FIGS. 14A and 14B are plan views of two stone gauges utilized in the stone gauge set of FIG. 13.

DETAILED DESCRIPTION OF THE INVENTION

Referring now to FIGS. 9 and 10, a first embodiment of the stone gauge 50 of the present invention is illustrated. As shown therein, stone gauge 50, preferably formed of stainless steel, includes a handle 52 connected to a stone simulant 54 which is a three-dimensional simulant of a standard round diamond. Thus, the simulant 54 includes a cone-shaped section 56 which terminates at a point 58 corresponding to the culet 20 of FIG. 1 and extending from an outermost edge 60 corresponding to the girdle 16. The stone simulant has an axis 59 which extends from its top 58 through the center of a circle defined by the edge 60. While the girdle 16 normally has a height which extends in a direction perpendicular to axis 59, the edge 60 can normally be formed in a single plane to simplify manufacturing procedures. The simulant 54 also includes a truncated cone section 62 (coaxial with axis 59) which extends from the edge 60 to an area 64 corresponding to the table 14 of the stone of FIG. 1.

The handle section 52 extends from the area 64 of the simulant 54 in a direction generally parallel to axis 59. In the presently preferred embodiment, the handle 52 includes a cylindrical grasping section 66 which is of suitable diameter to be comfortably held by a human hand. If the stone simulant 54 is of sufficient size, the entire handle 52 may be of equal diameter. In the embodiment illustrated in FIGS. 9 and 10, the area 64 of the stone simulant 54 is of lesser diameter than the grasping section 56. For this reason, the grasping section 56 tapers into a neck 68 whose diameter is equal to the diameter of area 64. While a smaller diameter can be used, a diameter equal to that of area 64 is optimal since it provides maximum strength to the neck 68 and reduces the number of cutting operations required in the manufacturing process. A size marking 70 is preferably formed in the grasping section 66 to inform the user of the size of the stone simulant 54.

In the embodiment illustrated herein, the handle section 52 is cylindrical in shape. Any other desired shape can be used as long as the handle section extends away from the stone simulant 54 in the general direction of the axis 59 of the stone simulant. One alternative handle section is illustrated in FIGS. 14A and 14B and will be described below. Whatever the particular shape of the handle section 52, it is desirable to have some section which corresponds to neck 68 (extends along the axis 59 of the stone simulant 54 and is as thin as or thinner than the area 64 corresponding to table 14) so that the simulant 54 may be easily placed into a setting even if the setting is located in between projecting portions of a piece of jewelry.

As noted above, the present invention preferably includes a plurality of diamond gauges corresponding to different size stones (e.g., ½ to 50 points). A first embodiment of a stone gauge set constructed in accordance with the principles of the present invention is illustrated in FIG. 11. In this embodiment, a plurality of diamond gauges 50 (for ease of illustration, only two gauges 50 are illustrated, the remaining gauges being shown schematically) extend like spokes from a cylindrical base 72 which may be formed of a clear plastic material and is preferably molded around the gauges 50 so that the gauges are permanently affixed to the base 72. If desired, however, the base 72 may be formed in such a manner that the gauges 50 are normally pressure fit into respective cylindrical openings 74 in the base 72 but may be removed therefrom when desired (see gauge 50').

A second embodiment of a stone gauge set constructed in accordance with the principles of the present invention is illustrated in FIG. 12. As shown therein, a three-tiered base 76 has a plurality of cylindrical openings 78 formed therein. A respective gauge 50 (for ease of illustration, only four gauges 50 are illustrated, the remaining gauges being shown schematically) is received in each opening 78. The diameter of each opening 78 is somewhat greater than the diameter of the handle section 68 of the gauge 50 so that the gauge 50 can be easily placed in and withdrawn from its respective opening 78.

A size marking 70 is provided adjacent each opening 78 to provide an indication of the size of the stone simulant located on the respective gauge 50. The gauges are preferably aligned along three separate rows, one on each level of the base 76 to provide easy identification and handling. A transparent cover 82 fits over the base 76 which acts as a safety cover which protects both the gauges 50 from being broken and prevents individuals from accidentally stabbing themselves on the gauges when the gauges are not in use. The cover 84 may be fully removable from the base 76 or may be pivotally connected thereto as desired.

A third embodiment of a stone gauge set constructed in accordance with the principles of the present invention is illustrated in FIGS. 13 14a and 14b. As shown therein, the handle section 52' includes a cylindrical neck 68 which couples the stone simulant 54 to a flat gripping section 66'. A tab 86 projects from the gripping section 66' and includes a size marking 70 imprinted thereon. The location of the tab 86 along the edge 88 of the gripping section 66' varies as a function of the size of the stone simulant 54. As best shown in FIG. 13, the position of the tabs 86 is preferably selected such that tabs of gauges of successively increasing sizes are displaced from each other to enable easy identification of the gauge size. An arcuate recessed slot 90 is formed in each of the gripping sections 66' to permit the gauge 38' to be suspended from a horizontal support member 92 forming part of the storage device 94. The support member 92 is connected to depending vertical support members 96, 98 which, in turn, are embedded into a base 100.

As above pointed out, the essential element of the present invention is the utilization of a gauge which provides an accurate simulation of the setting operation itself without making it necessary to try a diamond to see if it fits in the setting. Whereas the prior art has suggested the use of flat planar gauges to determine the exact size of a setting, they do not provide a true indication of which size diamond would actually fit. By using a plurality of gauges having stone simulants on each gauge, the gauge set provides an accurate determination of which stone would really fit and thereby makes it necessary to manipulate the stone only to the extent necessary to insert the predetermined and preselected stone into the setting.

By this means, repeated manipulation of the minute stones is obviated. The possibility of damaging the stones is decreased and the possibility of the stones gathering dirt, other extraneous materials or other surface blemishes which might subsequently not be available for removal after the setting or be concealed by part of the setting and which will reduce the reflectivity brilliance or fire of the stone is avoided.

In the foregoing description, reference is made to the setting of diamonds. It will be recognized, however, that the diamond gauge of the present invention is equally useful in the setting of any stone whose shape is mimicked by the stone simulant 54 located at the end of the gauges.

In the foregoing description, a diamond gauge for a brilliant cut diamond has been described. The present invention is applicable, however, to other shape cuts such as marquise, baguette, pear and oval. In such a case, the shape of the stone simulant 54 will mimic that of the diamond to be set.

In the foregoing, therefore, the present invention has been described solely in connection with preferred illustrative embodiments thereof. Since many variations and modifications of the present invention will now become obvious to those skilled in the art, it is preferred that the scope of the present invention be determined not by the specific disclosures herein contained but only by the appended claims.

What is claimed is:

1. A diamond gauge, comprising:
    a three-dimensional stone simulant having a central axis and having sections corresponding generally to the culet, the girdle and the table of a cut diamond; and
    a handle connected to said section corresponding to the table of a cut diamond and extending in a direction generally parallel to said central axis.

2. The diamond gauge of claim 1, wherein said handle is generally cylindrical in shape and is generally coaxial with said central axis.

3. The diamond gauge of claim 1, wherein said handle has a gripping section and a neck section, said neck section connecting said gripping section to said stone simulant.

4. The diamond gauge of claim 3, wherein said gripping section has a size and shape which is easily grasped by an adult human hand.

5. The diamond gauge of claim 3, wherein said neck section is generally cylindrical in shape and generally coaxial with said central axis.

6. The diamond gauge of claim 5, wherein said gripping section is generally cylindrical in shape and coaxial with said central axis and whose diameter is greater than the diameter of said neck section.

7. The diamond gauge of claim 5, wherein said gripping section is planar in shape.

8. The diamond gauge of claim 7, further including a tab extending from said gripping section and having an indication of the size of said stone simulant located thereon.

9. The diamond gauge of claim 1, further including a marking on said handle section which indicates the size of said stone simulant.

10. The diamond gauge of claim 1, wherein said stone simulant comprises:
    a conical section having a tip and a base and being located coaxially with said central axis, said tip corresponding to said culet; and
    a truncated cone section having a minor base and a major base and being located coaxially with said central axis, said major base abutting said base of said conical section, said minor base corresponding to said table, the intersection of said base of said conical section and said major base corresponding to said girdle.

11. A set of diamond gauges, comprising:
    (A) a base having a plurality of openings therein; and
    (B) a plurality of diamond gauges equal in number to the number of said openings, each said diamond gauge being received in a respective said opening, each said gauge including:
        (1) a three-dimensional stone simulant having a central axis and having sections corresponding generally to the culet, the girdle and the table of a cut diamond; and
        (2) a handle connected to said section corresponding to the table of a cut diamond and extending in a direction generally parallel to said central axis.

12. The set of diamond gauges of claim 11, wherein said base is cylindrical in shape and each of said gauges extends along a respective radius of said base.

13. The set of diamond gauges of claim 12, wherein each of said gauges is fixedly embedded in its respective opening.

14. The set of diamond gauges of claim 13, wherein each of said gauges is removably embedded in its respective opening.

15. The set of diamond gauges of claim 11, wherein said base is box-like and wherein said openings are formed in a plurality of rows each of which extend along the length of said base.

16. The set of diamond gauges of claim 15, wherein said openings releasably support its respective gauge therein.

17. The set of diamond gauges of claim 16, wherein said base has a plurality of levels of different height and wherein each said row is located in a respective said level.

18. The set of diamond gauges of claim 17, further including a removable safety cover which fits on said base and encloses said gauges.

19. The set of diamond gauges of claim 18, wherein said cover is transparent.

20. The set of diamond gauges of claim 11, wherein said handle is generally cylindrical in shape and each of said openings has a corresponding cylindrical shape adapted to removably receive the handle of its respective gauge.

* * * * *